United States Patent
Ohtsu et al.

(10) Patent No.: US 6,986,531 B2
(45) Date of Patent: Jan. 17, 2006

(54) STEERING COLUMN LINKAGE TILT LEVER

(75) Inventors: Hitonobu Ohtsu, Tokyo (JP); Albert C. Huber, Montrose, MI (US)

(73) Assignee: Delphi Technologies, Inc., Troy, MI (US)

(*) Notice: Subject to any disclaimer, the term of this patent is extended or adjusted under 35 U.S.C. 154(b) by 154 days.

(21) Appl. No.: 10/626,421

(22) Filed: Jul. 24, 2003

(65) Prior Publication Data

US 2005/0017492 A1    Jan. 27, 2005

(51) Int. Cl.
*B62D 1/18* (2006.01)

(52) U.S. Cl. .................................... 280/775

(58) Field of Classification Search ............. 280/775, 280/779; 74/493
See application file for complete search history.

(56) References Cited

U.S. PATENT DOCUMENTS

| | | | |
|---|---|---|---|
| 4,593,577 A * | 6/1986 | Kinoshita | 74/493 |
| 5,409,261 A * | 4/1995 | Yamaguchi | 280/775 |
| 5,566,585 A * | 10/1996 | Snell et al. | 74/493 |
| 5,820,163 A | 10/1998 | Thacker et al. | 280/775 |
| 6,272,945 B1 | 8/2001 | Jolley | 74/493 |
| 6,279,414 B1 * | 8/2001 | Moon | 74/493 |
| 6,460,427 B1 | 10/2002 | Hedderly | 74/493 |

* cited by examiner

*Primary Examiner*—Faye M. Fleming
(74) *Attorney, Agent, or Firm*—Michael D. Smith

(57) ABSTRACT

The latch mechanism includes the shoe release lever pivotally attached to the support housing for pivotal movement about a lever axis parallel to the tilt axis between the latched position and the unlatched position. A tab extends from a slide to define a connection between the lever and the slide for moving the slide out of engagement with a tilt shoe thereby allowing rotation of the tilt shoe to the unlatched position. The connection, defined by the tab and opening, is spaced along the release lever from the lever axis and the distal end defined by a knob to provide compact packaging while retaining adequate mechanical advantage.

7 Claims, 3 Drawing Sheets

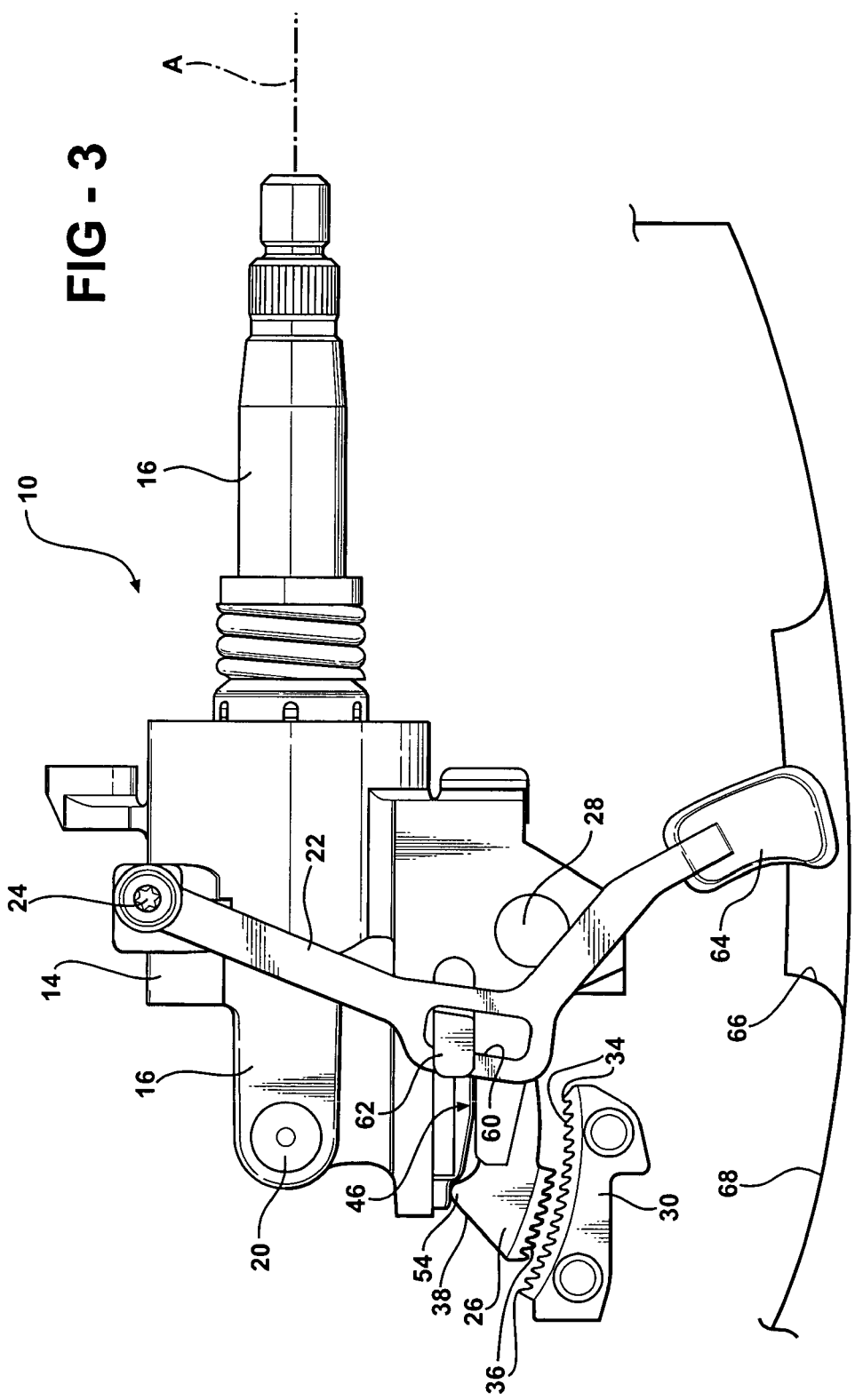

STEERING COLUMN LINKAGE TILT LEVER

FIELD OF THE INVENTION

This invention relates to a fine increment tilt assembly for a vehicle steering column.

BACKGROUND OF THE INVENTION

The tilt assembly for a vehicle steering column to which the subject invention pertains normally include a support housing to be supported by the vehicle for rotatably supporting the lower steering shaft, a tilt housing defining an upper steering shaft axis for rotatably supporting an upper steering shaft for rotation about the axis, and a pivotal connection pivotally connecting the tilt housing to the support housing for pivotal movement about a tilt axis extending transversely to the upper steering shaft axis. A manually actuated latch mechanism is moveable between a latched position for preventing the pivotal movement of the tilt housing and an unlatched position for allowing the pivotal movement of the tilt housing relative to the support housing about the tilt axis.

The manually actuated portion, e.g., a tilt release lever, of the latch mechanism is normally orientated to extend transversely of the steering column thereby projecting radially. Due to the width of the tilt assembly the distance between the pivot axis of the release lever and the action point along the lever that transmits the unlatching force is limited, as is the distance the lever extends from the tilt assembly. Therefore, the mechanical advantage provided by the release lever is the total length of the release lever divided by the distance between the pivot axis and the action point. The undue projection of the release lever from the tilt assembly also presents packaging problems or limitations.

SUMMARY OF THE INVENTION AND ADVANTAGES

The subject invention provides such a tilt assembly for a vehicle steering column by including a release lever pivotally attached to the support housing for pivotal movement about a lever axis parallel to the tilt axis between the latched position and the unlatched position.

This disposition of the release lever provides significantly greater flexibility in selecting the mechanical advantage applied by the lever. The orientation of the release lever also provides enhanced packaging of the latch mechanism for the tilt assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a view like FIG. 2 but showing the unlatched position for tilting movement of the steering wheel.

DETAILED DESCRIPTION OF THE PREFERRED EMBODIMENT

Figure 1:
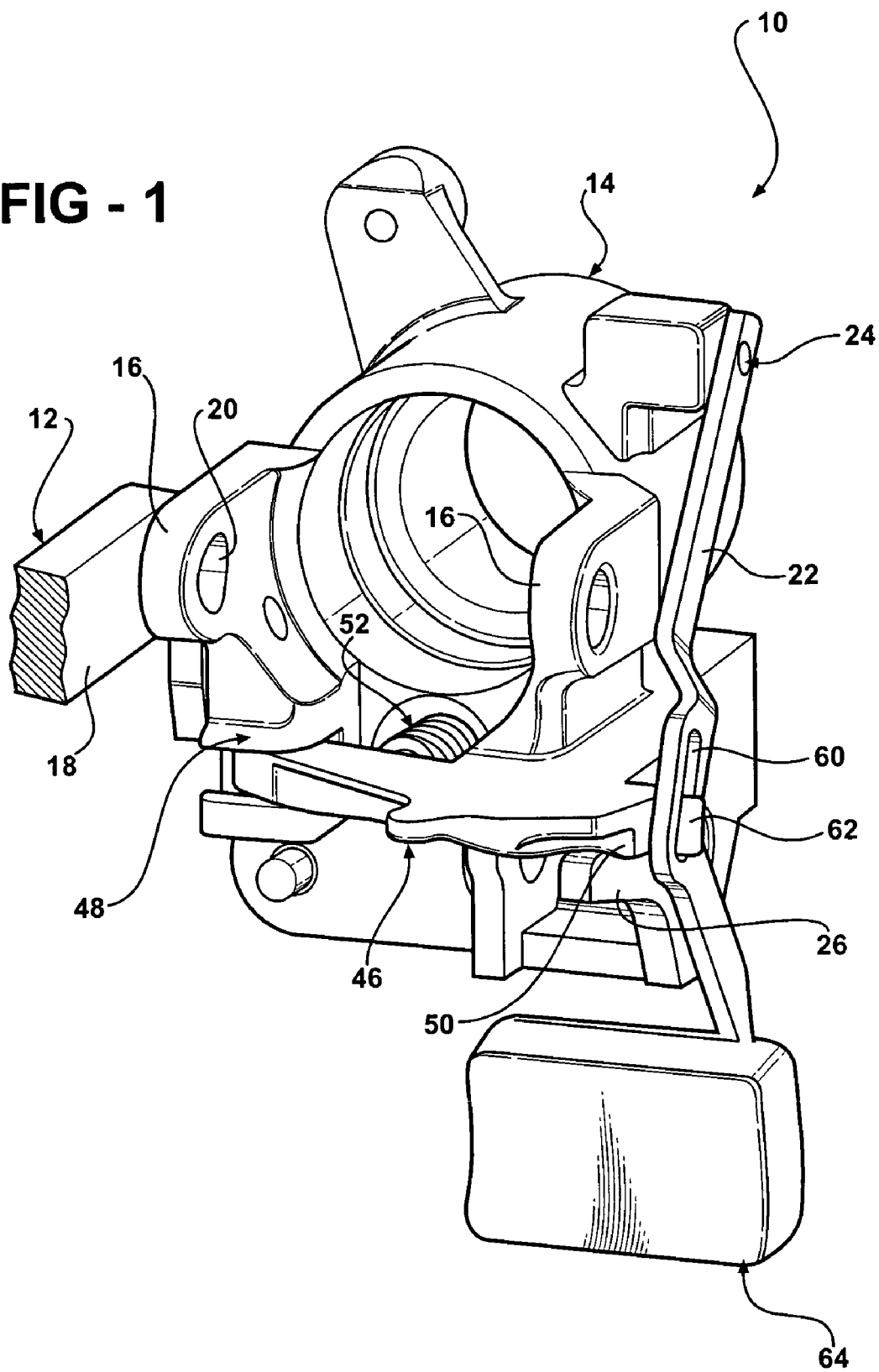
FIG. 1 is a perspective view of a tilt assembly for a vehicle steering column that may incorporate the subject invention.
Figure 2:
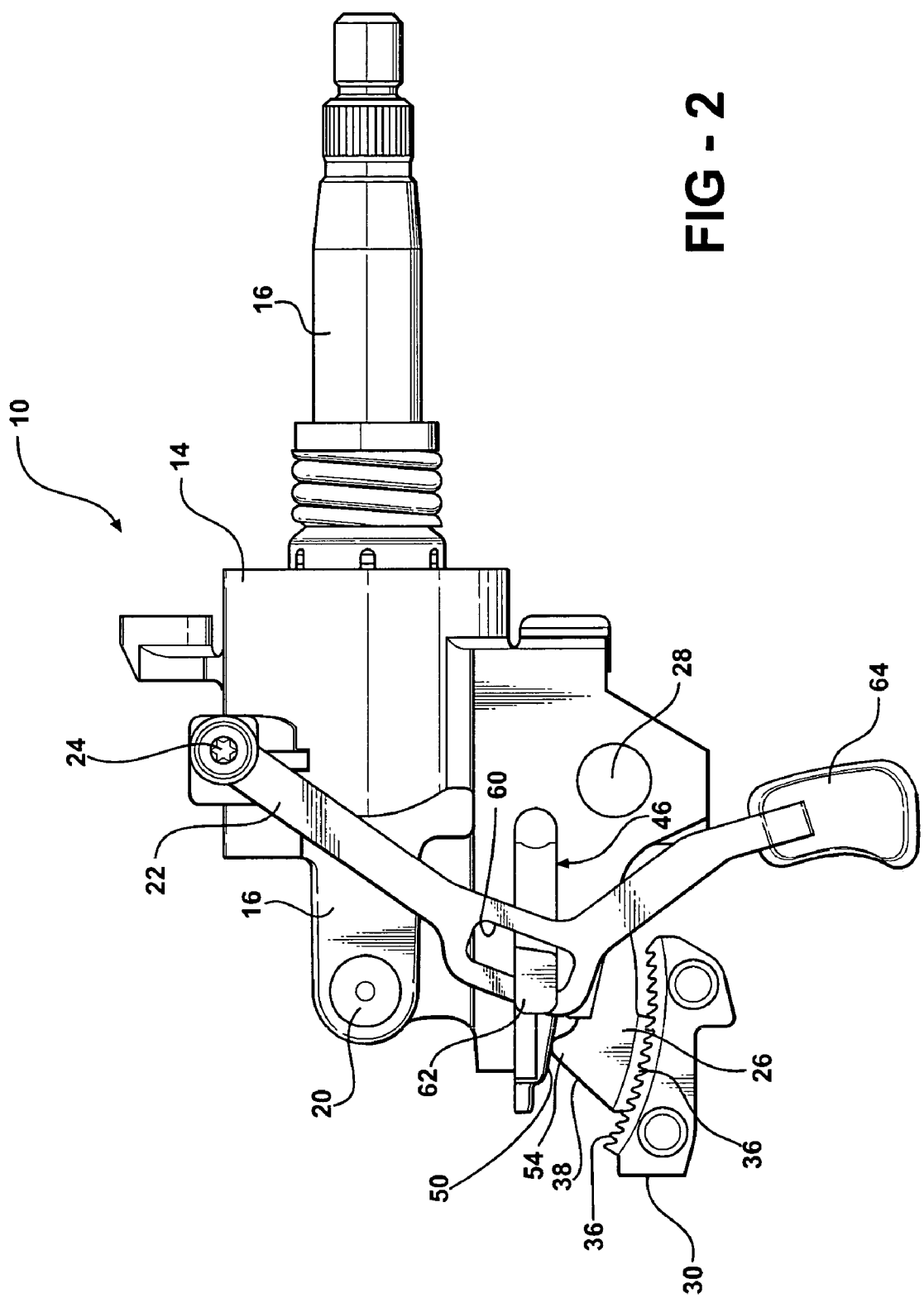
FIG. 2 is a side view of a tilt assembly in the latched position to prevent tilting movement.

A manual type tilting assembly for a vehicle steering column is generally shown at 10 in FIGS. 1–3. As is well known in the art, the assembly includes a support housing, generally indicated at 12, to be supported by a vehicle and partially shown in FIG. 1. The support housing 12 forms part of the steering column that rotatably supports a steering shaft. A tilt housing 14 defines an upper steering shaft axis (A) for rotatably supporting an upper steering shaft 16 for rotation about the shaft axis (A).

The tilt housing 14 has two forwardly extending ears 16 and the support housing 12 has two rearwardly extending ears 18 and a pivot pin defines a pivotal connection 20 pivotally connecting the tilt housing 14 to the support housing 12 for pivotal movement about a tilt axis extending transversely to the upper steering shaft axis (A).

The assembly includes a latch mechanism moveable between a latched position (FIG. 2) for preventing the pivotal movement of the tilt housing 14 and an unlatched position (FIG. 3) for allowing the pivotal movement of the tilt housing 14 relative to the support housing 12 about the tilt axis.

The invention is distinguished by a latch mechanism including a release lever 22 pivotally attached 24 to the tilt housing 14 for pivotal movement about a lever axis parallel to the tilt axis 20 between the latched position and the unlatched position. Said another way, the release lever is rotatable in a plane parallel to a plane perpendicular to the tilt axis 20 and containing the steering axis (A).

The latch mechanism includes a tilt shoe 26 pivotally supported by the tilt housing 14 for movement about a shoe pivot axis 28 that is parallel to the tilt axis 20 between the latched position engaging a lock shoe 30 fixed to the support housing 12 by rivets 32, or the like, and the unlatched position out of engagement with the support housing 12. The lock shoe 30 has a plurality of fixed teeth 34. The tilt shoe 26 extends from the shoe pivot axis 28 to a latch end 38 and a plurality of shoe teeth 36 are disposed on the latch end 38 of the tilt shoe 26 for engaging the fixed teeth 34 in the latched position.

The tilt shoe 26 is biased to rotate out of engagement with the fixed shoe 30 by a spring, or the like. The latch mechanism includes a slide, generally indicated at 46, movably supported by the tilt housing 14 for pivotally movement about a slide axis 48 and having a blocking end 50 for engaging the tilt shoe 26 to prevent the tilt shoe 26 from moving out of the latched position. The slide axis 48 is transverse to the tilt axis 20.

A projection 54 extends from the tilt shoe 26 in the opposite direction from the shoe teeth 36 for engaging the blocking end 50 of the slide 46 in the latched position. A biasing device such as a spring 52 urges the slide 46 to pivot outwardly about its pivot axis 48. The blocking end 50 is tapered for wedging engagement with a projection 54 so that as the blocking end is biased forwardly by the spring 52, it is wedged into engagement with the projection 54 thereby forcing the tilt shoe 26 to rotate downwardly for the teeth 36 of the tilt shoe 26 to engage the teeth 34 of the fixed shoe 30.

The latch mechanism includes the shoe release lever 22 pivotally attached 24 to the tilt housing 14 for pivotal movement between the latched position and the unlatched position. An opening 60 in the lever 22 and a tab 62 extending from the blocking end 50 of the slide 46 define a connection between the lever 22 and the blocking end 50 of the slide 46 for moving said blocking end 50 out of engagement with the projection 54 thereby allowing rotation of the tilt shoe 26 about the shoe pivot axis 28 to the unlatched position with the shoe teeth 36 out of engagement with the fixed teeth 34. The connection, defined by the tab 62 and opening 60, is spaced along the release lever 22 from the lever axis 24 and the distal end defined by a knob 64.

In order to disengage the tilt shoe teeth 36 from the fixed teeth 34 for tilting the tilt housing 14 about the tilt axis 20, the knob 64 is manually grasped through the opening 66 in a shroud 68 to rotate the release lever 22 forwardly about its pivot 24, i.e., toward the driver. As the release lever 22 rotates or pivots forwardly the tab 62 extending from the slide 46 pivots about its pivot axis 48 and the blocking end 50 is moved rearwardly by engagement with the opening 60 in the release lever 22. As the blocking end 50 is moved rearwardly, it moves out of blocking engagement with the projection 54 of the tilt shoe 26. When the teeth 36 of the tilt shoe 26 are out of engagement with the fixed teeth 34 of the fixed shoe 30, the tilt housing 14 is free to rotate about the tilt axis 20 to an adjusted position.

Obviously, many modifications and variations of the present invention are possible in light of the above teachings. The invention may be practiced otherwise than as specifically described within the scope of the appended claims.

What is claimed is:

1. A manual type tilting assembly for a vehicle steering column comprising;
   a support housing to be supported by a vehicle,
   a tilt housing defining an upper steering shaft axis (A) for rotatably supporting an upper steering shaft for rotation about said axis,
   a pivotal connection pivotally connecting said tilt housing to said support housing for pivotal movement about a tilt axis extending transversely to said upper steering shaft axis (A), and
   a latch mechanism moveable between a latched position for preventing said pivotal movement of said tilt housing and an unlatched position for allowing said pivotal movement of said tilt housing relative to said support housing about said tilt axis,
   said latch mechanism including a release lever pivotally attached to said support housing for pivotal movement about a lever axis parallel to said tilt axis between said latched position and said unlatched position, a tilt shoe pivotally supported by said tilt housing for movement about a shoe pivot axis between said latched position engaging said support housing and said unlatched position out of engagement with said support housing, and a slide movably supported by said tilt housing relative to said release lever and having a blocking end for engaging said tilt shoe to prevent said tilt shoe from moving out of said latched position, and wherein said release lever extends from said lever axis to a distal end, and including a connection between said lever and said slide to cause movement of said slide in response to moving said release lever.

2. An assembly as set forth in claim 1 wherein said connection is spaced along said release lever from said lever axis and said distal end.

3. An assembly as set forth in claim 2 wherein said connection includes an opening in said release lever and a tab extending from said slide and into said opening.

4. An assembly as set forth in claim 3 wherein said slide is pivotally connected to said tilt housing for rotation about a slide axis that is transverse to said tilt axis.

5. An assembly as set forth in claim 4 including a lock shoe fixed to said support housing and having a plurality of fixed teeth, and wherein said tilt shoe extends from said shoe pivot axis to a latch end, a plurality of shoe teeth disposed on said latch end of said tilt shoe for engaging said fixed teeth in said latched position.

6. An assembly as set forth in claim 5 including a projection extending from said tilt shoe in the opposite direction from said shoe teeth for engaging said slide in said latched position.

7. An assembly as set forth in claim 6 wherein shoe pivot axis is parallel to said tilt axis.

* * * * *